F. H. HAMBLETON.
MEASURING FAUCET.
No. 187,623. Patented Feb. 20, 1877.
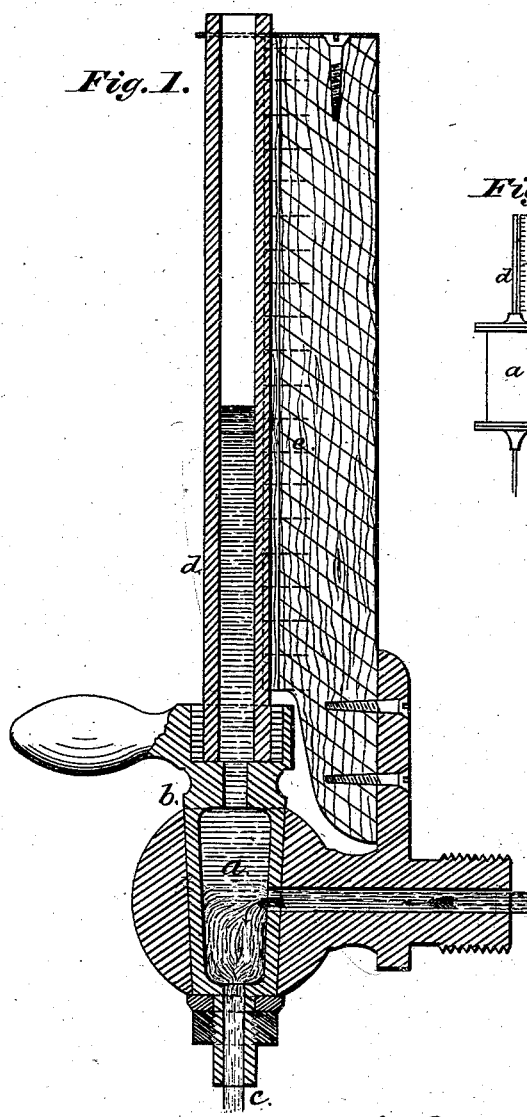
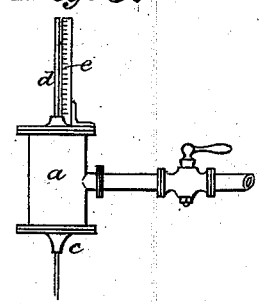
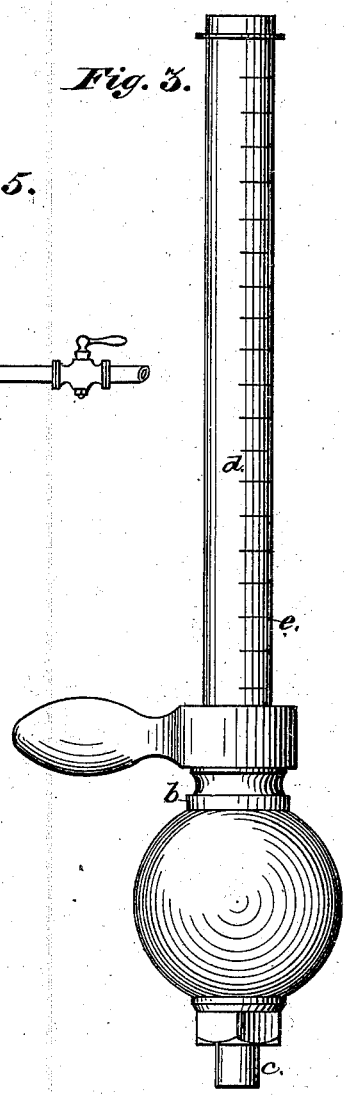
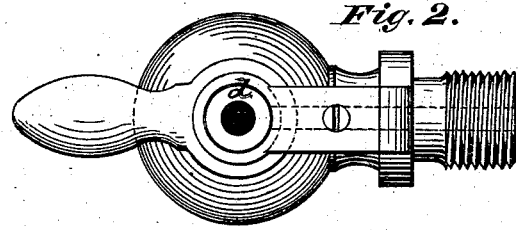
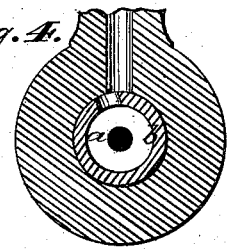

UNITED STATES PATENT OFFICE.

FRANCIS H. HAMBLETON, OF BALTIMORE, MARYLAND.

IMPROVEMENT IN MEASURING-FAUCETS.

Specification forming part of Letters Patent No. 187,623, dated February 20, 1877; application filed January 23, 1877.

*To all whom it may concern:*

Be it known that I, FRANCIS HENRY HAMBLETON, of Baltimore city, in the State of Maryland, have invented certain new and useful Improvements in Flow-Rate Indicator for Liquids; and I do hereby declare that the following is a full, clear, and exact description thereof, which will enable others skilled in the art to which it appertains to make and use the same, reference being had to the accompanying drawing, and to the letters of reference marked thereon, which form a part of this specification.

The object of my invention is to afford a simple and convenient means of ascertaining, by inspection, very nearly the rate of discharge of fluids without interrupting the flow as they are being drawn for manufacturing purposes or otherwise, and of producing any desired rate of flow within the capacity of the apparatus instantly. To accomplish this I employ a chamber which has three openings—one connecting with the source of supply, one with a discharge-nozzle, and one with a stand-pipe. The flow of the fluid into the chamber is controlled by an ordinary cock or valve in the supply-pipe. The flow out of the chamber or discharge is controlled by the pressure maintained in the chamber. The pressure in the chamber is indicated by the height that the fluid stands in the stand-pipe when discharging at the nozzle, and the desired pressure can be maintained or regulated by adjusting the supply-cock until the required height is had. The height is ascertained by the scale, and the scale is ascertained by actual measurement of the quantity flowing under different heads in the stand-pipe, or it may be nearly approximated by calculation.

Figure 1 represents a vertical section of the apparatus; Fig. 2, a top view; Fig. 3, a side elevation; Fig. 4, a horizontal section through the supply-port; and Fig. 5, a modification, showing the apparatus as constructed to avoid eddies.

One arrangement of the apparatus is shown by the accompanying drawing in the form of a plug-cock, the chamber being at $a$, the controlling-valve at $b$, the discharging-nozzle at $c$, the stand-pipe at $d$, and scale at $e$. By preference I employ a glass stand-pipe, for convenience; but any pipe with means of indicating the height of the liquid will answer. A convenient form is shown with the stand-pipe mounted on the axis of the plug of a plug-cock, and therefore moves with it.

Where great accuracy is required, a comparatively larger chamber should be employed, as shown in Fig. 5, to avoid the effects of eddies arising from the oblique approach of the supply to the chamber, as would be the case in the plug-cock when the port is partly closed.

It would be possible to have several different nozzles for different fluids, which would give the same rate of discharge for the respective liquids by one standard scale, or several different scales, which would give the same rate of discharge for different fluids.

Where it is not desirable to control the flow, but simply to indicate what it is, the cock or valve on the supply-pipe may be omitted.

The essential arrangement of the matter is, that a stand-pipe should indicate the head of liquid in a chamber communicating with an unalterable nozzle, and that the supply of liquid to the chamber carrying the nozzle and stand-pipe should be capable of increase or diminution under variable pressures, where such is desirable, by means of a valve or cock, so as not to disturb the size or operation of the discharge-nozzle.

The stand-pipe may be opened or closed at the top, as may be deemed best; but under heavy pressure from the supply it may be found necessary to have it closed.

I claim—

1. A flow-rate indicator for liquids, consisting, essentially, of a chamber having three openings—one connecting with the source of supply, one with a discharge-nozzle, and one with a stand-pipe—for showing the head, and thereby indicating the rate of flow.

2. A flow-rate indicator for liquids, consisting, essentially, of a chamber having three openings—one connecting with the source of supply, one with a discharge-nozzle, and one with a stand-pipe—in combination with a cock or valve for controlling the desired rate of flow.

In testimony that I claim the foregoing I have affixed my signature in the presence of two witnesses.

FRANCIS H. HAMBLETON.

Witnesses:
A. E. H. JOHNSON,
J. W. HAMILTON JOHNSON.